Feb. 13. 1940.  C. L. TAYLOR  2,190,371
SHAFT MOUNTING FOR ROLLS OR THE LIKE
Filed March 1, 1938   2 Sheets-Sheet 1

INVENTOR.
CLARENCE L. TAYLOR
BY Richey & Watts
ATTORNEYS.

Feb. 13, 1940.    C. L. TAYLOR    2,190,371
SHAFT MOUNTING FOR ROLLS OR THE LIKE
Filed March 1, 1938    2 Sheets-Sheet 2
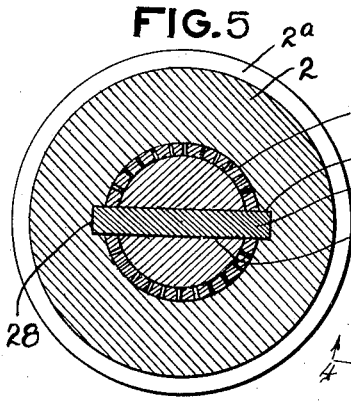
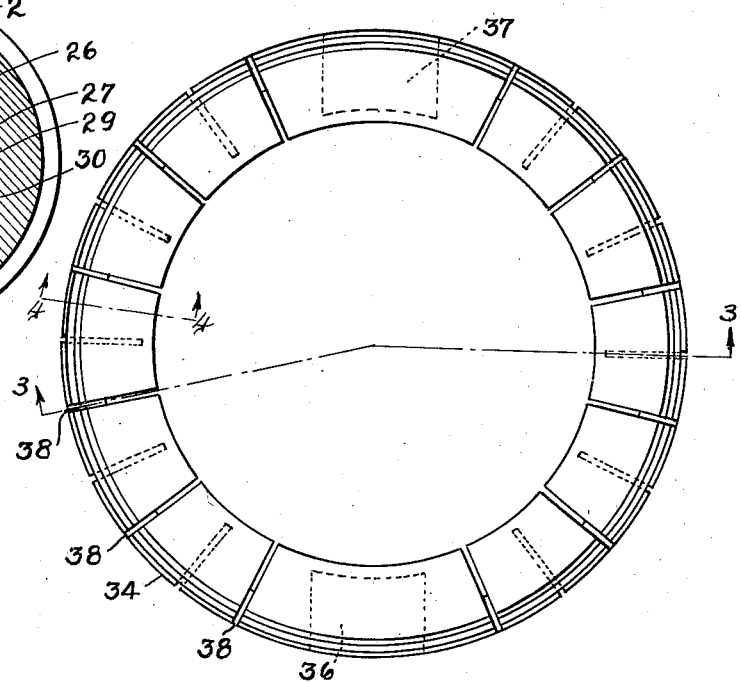
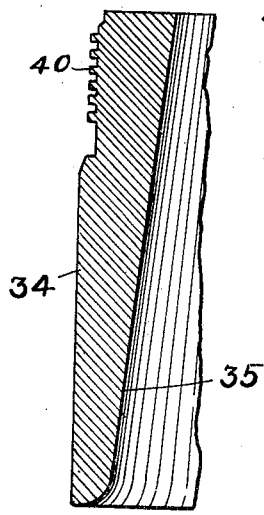
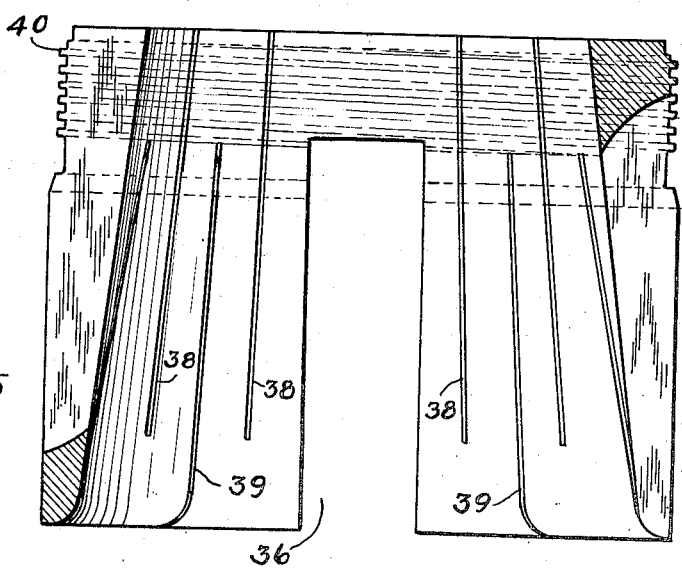
INVENTOR.
CLARENCE L. TAYLOR.
BY *Richey & Watts*
ATTORNEY.

Patented Feb. 13, 1940

2,190,371

UNITED STATES PATENT OFFICE 2,190,371

SHAFT MOUNTING FOR ROLLS OR THE LIKE

Clarence L. Taylor, Youngstown, Ohio, assignor to The Aetna Standard Engineering Company, Youngstown, Ohio, a corporation of Ohio Application March 1, 1938, Serial No. 193,322

1 Claim. (Cl. 287—52.01)

This invention relates to mechanism for mounting driven members on rotatable shafts and more particularly to roll supporting mechanism for edging mills or the like.

In rolling steel billets to produce bars, plates, sheets, etc., vertical edging mills are employed which comprise pairs of rolls mounted on vertical shafts, the rolls and shafts being so supported that they may be adjusted toward or away from each other to vary the width of the roll pass formed therebetween. In large mills the roll pressure is very high, running up to 300,000 pounds or more and a serious problem is presented in maintaining the fit of the rolls on the shafts to prevent play between the rolls and shafts and thus to insure the accuracy of the rolling operation. It is desirable to have the rolls so mounted on the shafts that they may be readily removed when it is necessary to change rolls and also desirable to have the rolls so mounted that they will always be disposed in the same axial position on the shaft. An ordinary tapered shaft with a correspondingly tapered bore in the roll and means for forcing the roll onto the shaft will permit of the necessary tight fit or engagement of the roll with the shaft. However, such an arrangement makes it difficult to determine with accuracy the axial position of the roll on the shaft and any wear or variation in diameter, either of the shaft or the bore of the roll, will result in a shifting of the axial position of the roll when seated on the shaft.

It is among the objects of the present invention to provide an improved mounting for members which are to be tightly but removably secured to a shaft and particularly for rolling mill rolls in which the rolls may be located in a definite axial position on the shaft, may be restrained from any play or looseness relative to the shaft, and are so mounted that they may readily and easily be removed and replaced. Other objects of my invention are the provision of a simple and effective means for maintaining rolls, pulleys, wheels or the like tightly mounted on their shafts in which the advantages of a tapered fit are obtained without the usual accompanying difficulty in locating the roll axially on the shaft; the provision of a self adjusting means for causing a tight fit between a roll and its driving shaft which will operate effectively regardless of reasonable variations in shaft diameter and/or roll bore diameter; the provision of a roll mounting which permits of a keyed connection to the shaft and assures that all rolls will have the same axial location on the shaft; and the provision of a very effective roll mounting which permits of instant removal of the roll with accompanying removal of a minimum of the parts of the mounting and which has long life and is particularly effective for mounting the rolls of heavy duty vertical edging mills.

The above and other objects of my invention will be seen from the following description of a preferred embodiment thereof, in which—

Figure 2 is a plan view of my improved resilient tapered bushing.

Figure 3 is a vertical sectional view taken on line 3—3 of Figure 2.

Figure 4 is a vertical cross-sectional view taken on line 4—4 of Figure 2.

Figure 5 is a horizontal cross-sectional view taken on line 5—5 of Figure 1.

Figure 1:
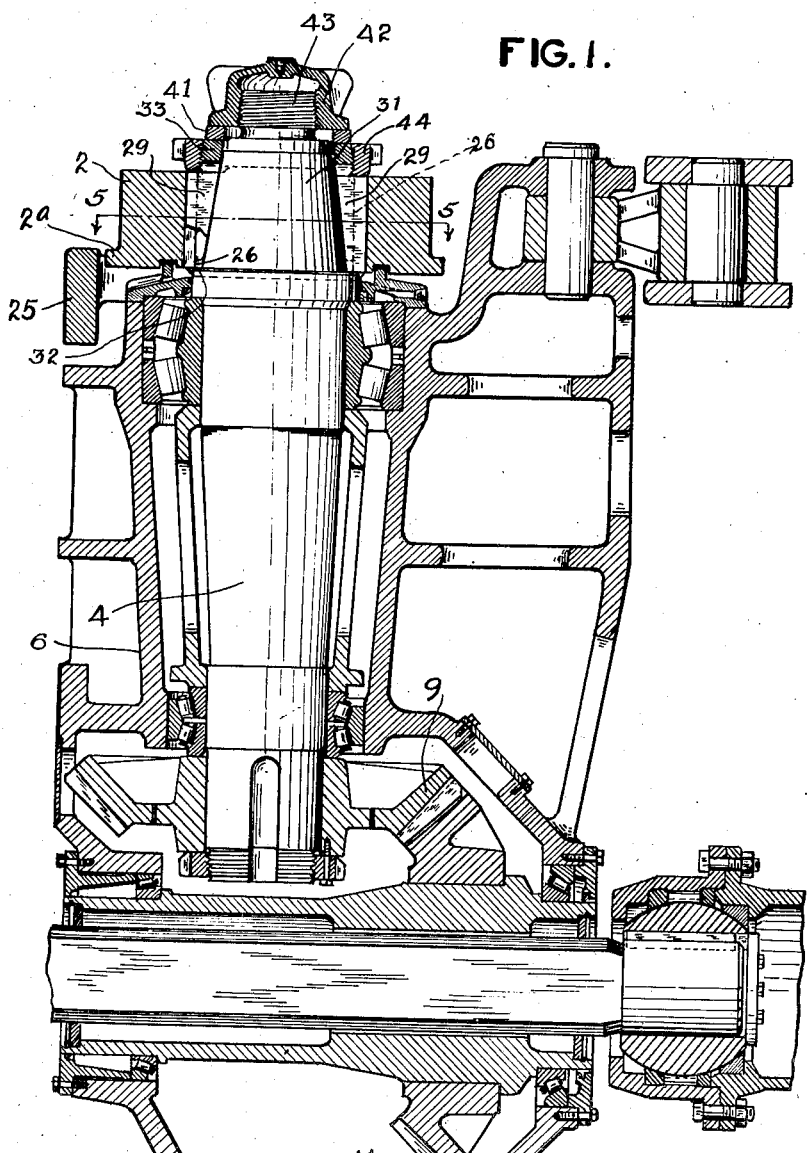
Figure 1 is an enlarged vertical cross-sectional view of a roll shaft and roll equipped with my improved roll mounting.

In Figure 1 an edging roll 2 having a bottom flange 2a is mounted on a vertical shaft 4 which may be driven by any suitable means such as the gears 9 and 11 which are supported in the housing 6. A work support 25 is mounted adjacent to and having its upper surface substantially in alignment with the upper surface of the flange 2a. My improved mounting for the roll 2 provides means for, at all times, maintaining the top surface of the flange 2a in the same position relative to the top surface of the work support 25, and thus wear of the shaft or of the bushing parts, or changes of rolls, does not interfere with maintaining the proper position of the roll 2 relative to other parts of the structure in which it is used.

As is best seen in Figures 1 and 5, the roll 2 has a cylindrical bore 26 and is provided with diametrically opposite keyways 27 and 28. A flat driving key 29 extends through a slot 30, which passes through the tapered portion 31 of the shaft 4, and extends into the keyways 27 and 28 in the roll 2. The bottom surface of the roll 2 engages the top surface of a flange 32 which extends outwardly from the base of the tapered portion 31 of the shaft 4. It will be seen that the bore 26 of the roll 2 is considerably larger than the tapered portion 31 of the shaft but that the flange 32 extends out beyond the bore in the roll, thus providing a definite means for locating the roll axially on the shaft 4.

In order to maintain the roll concentric with and free from any play or movement relative to the shaft, I provide a resilient tapered wedge bushing member which I have generally indicated at 33. This bushing has a cylindrical outer surface 34 which is adapted to engage the bore 26 of the roll 2 and a tapered inner surface 35 which is adapted to engage the tapered portion 31 of the shaft 4. This bushing also has diametrically opposed slots 36 and 37 which extend upwardly from the bottom or thin end thereof and which fit over the key 29. In order to provide the necessary circumferential resiliency in the tapered bushing 33 I preferably cut a plurality of slots 38 which extend downwardly from the top or thick end of the bushing but stop short of the bottom end thereof and a plurality of slots 39 which extend upwardly from the bottom or thin end of the bushing and stop short of the top thereof. These slots are alternately arranged as is clearly seen in Figures 2 and 3 and permit of a degree of radial expansion and contraction of the bushing 33. Threads 40 are formed on the upper end of the bushing 33, the diameter of the upper portion of the bushing being reduced so that the outside diameter of the threads is less than the outside diameter of the cylindrical wall 34 of the bushing.

The assembly of the roll on the shaft is seen in Figure 1. The key 29 is first inserted in the slot 30 and the roll 2 placed over the shaft with the key 29 engaging the keyways 27 and 28. The bottom surface of the roll 2 engages the flange 32 on the shaft 4, thus definitely fixing the axial position of the roll on the shaft. The resilient tapered bushing 33 is then placed in the clearance space between the cylindrical bore of the roll 2 and the tapered portion 31 of the shaft 4. An annular thrust washer 41, of smaller diameter than the threaded portion of the bushing, engages the top of the bushing and is in turn engaged by the wing nut member 42 which has threaded engagement with the upper end 43 of the shaft 4. By screwing down the wing nut 42 pressure is exerted against the top of the bushing 33 and such pressure will cause the tapered bushing 33 to slide down on the tapered end 31 of the shaft until it is driven home forming a completely tight and concentric wedge member to retain the roll 2 abolutely free from any play relative to the shaft 4.

A bushing removing nut 44 has threaded engagement with the threads 40 on the upper end of the bushing 33. While the screw 42 is being tightened down and the bushing is being seated this nut 44 is backed off so that it will not engage the top surface of the roll 2. When it is desired to remove the roll 2 it is only necessary to screw down the nut 44 until its bottom surface engages the top of the roll 2. By turning the nut 44 further the tapered wedge bushing will be lifted from its seated position, it being understood that the nut 42 has first been backed off, thus loosening the mounting of the roll 2 on the shaft 4. By then unscrewing the nut 44 completely from the bushing 33 the roll 2 can be lifted completely off from the shaft. This is possible because the bore 26 in the roll 2 is larger than the threaded upper end 40 of the bushing 33, the thrust washer 41, and the wing nut 42.

It will be seen that my resilient tapered wedge bushing may expand and contract radially and, as its lower or thin end will never seat against the flange 32 of the shaft 4 (see Fig. 1), it will always be effective to form a tight connection of the roll to the shaft. By slotting the bushing 33, as shown at 36 and 37 it may be slipped into place over the driving key 29. The square threads 40 on the top of the bushing are of such a pitch as to provide the necessary mechanical advantage to permit easy withdrawal of the wedge bushing even after it has been tightly seated. The threads 40 and the co-acting threads on the nut 44 are cut to provide relatively great clearance at the root of the threads so that when the bushing 33 is being seated and is caused to expand in diameter by being forced down on the tapered portion 31 of the shaft, such expansion can occur freely and without restriction of the upper end of the bushing by the encircling nut 44.

It will be seen from the above description of a preferred form of my roll mounting that I have provided a flexible, annular wedge member which may be driven into position between a roll and the roll shaft while permitting a keyed driving connection between the roll and the roll shaft. My wedge is sufficiently resilient to accommodate variations in shaft and roll bore diameter and permits tight fitting of the roll to the shaft and maintenance of the desired axial position of the roll on the shaft. My improved construction further permits of extremely easy and simple removal of the roll from the shaft by removing only the wedge lifting nut 44 from its engagement with the top of the wedge. The wedge bushing 33, the key 29, the washer 41 and the nut 42 may all remain in position on the shaft while the roll 2 is removed and changed or replaced.

Figure 6:
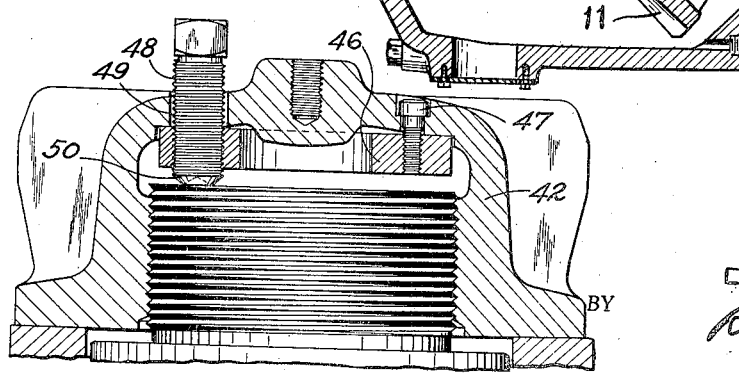
Figure 6 is an enlarged fragmentary section illustrating the wing nut locking means.

In Figure 6 I have illustrated a modified form of wing nut 42 in which means are provided to prevent accidental loosening of this wing nut on the threaded end 43 of the shaft 4. A plate 46 is secured within the hollow body of the wing nut 42 by means of a screw 47. On the opposite side of the plate 46 from the screw 47 a threaded aperture is provided for the locking screw 48. The top of the wing nut 42 is drilled as seen at 49 to permit the threaded screw 48 to pass freely therethrough. After the assembly, illustrated in Figure 1, has been completed and the tapered bushing firmly seated, the screw 48 is turned down until the cupped end 50 engages the top of the end 43 of the shaft 4. This tends to draw the threads of the wing nut 42 upwardly into firm engagement with the threads on the end of the shaft and the frictional engagement of the cupped end of the screw 48 with the top of the shaft effectively prevents relative rotation and loosening which might otherwise occur due to vibration of the apparatus when in operation.

Although I have described in considerable detail the illustrated embodiment of my invention it will be understood by those skilled in the art that my improved roll mounting may be adapted for mounting rolls on horizontal shafts and for use with other types of roll equipment than those shown. It is also readily adaptable for mounting wheels, pulleys, or other similar parts on shafts, and I do not, therefore wish to be limited to the specific embodiment herein shown and described but claim as my invention all embodiments thereof coming within the scope of the appended claim.

I claim:

In apparatus of the type described, a shaft having a tapered portion and a threaded portion, a member to be mounted on the shaft, said member having a bore larger than the tapered portion of said shaft, a resilient tapered wedge bushing having its outer surface adapted to conform to and engage with the bore in the member to be mounted on the shaft and having its inner surface adapted to conform to and engage with the tapered portion of the shaft, means on said shaft for limiting the axial movement of the member to be mounted on the shaft, threaded means adapted to pass through the bore in said member and engaging said threads on said shaft and adapted to move said resilient bushing into engagement with both the tapered surface of the shaft and the bore of the member to be mounted on the shaft, said resilient tapered bushing having threads at one end of greater diameter than said threaded means, a nut threaded to engage said threads on said bushing and adapted to bear against the member to be mounted on the shaft to release the wedge engagement of said bushing with said shaft and member, and a key extending through a slot in said shaft and engaging said member to be mounted on said shaft at two diametrically opposed points, said wedge bushing having diametrically opposed slots extending inwardly from its thin end whereby said wedge bushing may be moved into and out of position while retaining said key in position in said shaft.

CLARENCE L. TAYLOR.